United States Patent
An et al.

(10) Patent No.: US 11,791,103 B2
(45) Date of Patent: Oct. 17, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Hyeg Soon An, Suwon-si (KR); Seung In Baik, Suwon-si (KR); Ji Su Hong, Suwon-si (KR); Eun Ha Jang, Suwon-si (KR); Hee Sun Chun, Suwon-si (KR); Jae Sung Park, Suwon-si (KR); Je Hee Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 94 days.

(21) Appl. No.: 17/500,203

(22) Filed: Oct. 13, 2021

(65) Prior Publication Data

US 2022/0270824 A1     Aug. 25, 2022

(30) Foreign Application Priority Data

Feb. 24, 2021   (KR) .................... 10-2021-0024912

(51) Int. Cl.
*H01G 4/30*       (2006.01)
*H01G 4/008*     (2006.01)
*H01G 4/12*       (2006.01)
*H01G 4/012*     (2006.01)

(52) U.S. Cl.
CPC ............... *H01G 4/30* (2013.01); *H01G 4/008* (2013.01); *H01G 4/012* (2013.01); *H01G 4/1209* (2013.01)

(58) Field of Classification Search
CPC ...... H01G 4/008; H01G 4/012; H01G 4/1209; H01G 4/30
See application file for complete search history.

(56) References Cited

U.S. PATENT DOCUMENTS

2005/0264975 A1   12/2005   Yamazaki
2012/0306325 A1   12/2012   Kim
(Continued)

FOREIGN PATENT DOCUMENTS

JP     2006-270010 A       10/2006
JP     2015-026841 A       2/2015
KR   10-2012-0133697 A   12/2012

*Primary Examiner* — Nathan Milakovich
(74) *Attorney, Agent, or Firm* — MORGAN, LEWIS & BOCKIUS LLP

(57) ABSTRACT

A multilayer ceramic electronic component includes: a ceramic body having a capacitance formation portion, and including a dielectric layer and a first internal electrode and a second internal electrode with the dielectric layer interposed therebetween, a first margin portion disposed on the surface of the capacitance formation portion, and a second margin portion disposed on the other surface of the capacitance formation portion; a first external electrode; and a second external electrode. A following formula 1 is satisfied, [formula 1]−0.1≤(Tm−Ta)/Ta, where in the formula 1, Tm is an average height of a central region of the margin portion, and Ta is an average height of an outer region of the capacitance formation portion in a second direction.

12 Claims, 4 Drawing Sheets

(56) References Cited

U.S. PATENT DOCUMENTS

| | | | |
|---|---|---|---|
| 2014/0022690 A1* | 1/2014 | Kim | H01G 4/12 |
| | | | 361/301.4 |
| 2014/0022692 A1* | 1/2014 | Yoon | H01G 4/30 |
| | | | 156/322 |
| 2015/0116896 A1 | 4/2015 | Inazuka et al. | |
| 2016/0293333 A1* | 10/2016 | Kaneko | H01G 4/12 |
| 2017/0133157 A1* | 5/2017 | Fukunaga | H01G 4/1218 |
| 2020/0058447 A1* | 2/2020 | Choe | H01G 4/30 |
| 2020/0168398 A1* | 5/2020 | Suga | H01G 4/232 |

* cited by examiner

I-I'

MULTILAYER CERAMIC ELECTRONIC COMPONENT

CROSS-REFERENCE TO RELATED APPLICATION(S)

This application claims benefit of priority to Korean Patent Application No. 10-2021-0024912 filed on Feb. 24, 2021 in the Korean Intellectual Property Office, the disclosure of which is incorporated herein by reference in its entirety.

TECHNICAL FIELD

The present disclosure relates to a multilayer ceramic electronic component.

BACKGROUND

In general, an electronic component using a ceramic material such as a capacitor, an inductor, a piezoelectric element, a varistor or a thermistor includes a ceramic body made of a ceramic material, an internal electrode formed inside the body, and an external electrode installed on a surface of the ceramic body to be connected to the internal electrode.

In recent years, as electronic products have been miniaturized and multifunctionalized, chip components have also been miniaturized and have become highly functional. Therefore, multilayer ceramic electronic components are also required for high-capacitance products with small sizes and high capacitance.

The multilayer ceramic electronic component includes a dielectric ceramic, an internal electrode, and an external electrode, and is generally manufactured by simultaneous sintering. However, when a multilayer ceramic electronic component is manufactured through simultaneous sintering, a ceramic component of the dielectric layer and a metal component of the internal electrode exhibit different behaviors during the sintering process. Specifically, the ceramic component and the metal component have different shrinkage initiation temperatures during sintering and a shrinkage rate is often different.

A difference in firing shrinkage causes shape deformation of electronic components, which may lead to defects such as excitation, or the like, of shorts and margin portions, as well as affecting a grain and grain boundaries of the dielectric layer forming a capacitance, such that electrical characteristics of ceramic electronic components may be deteriorated. This causes a bigger problem as the size of the multilayer ceramic electronic component decreases, and there is a problem in that reliability, quality, and yield are deteriorated.

SUMMARY

One of the various objects of the present disclosure is to suppress structural deformation of a multilayer ceramic electronic component.

One of the various objects of the present disclosure is to reduce a short circuit rate of a multilayer ceramic electronic component.

One of the various objects of the present disclosure is to provide a multilayer ceramic electronic component having improved withstand voltage characteristics.

One of the various objects of the present disclosure is to provide a multilayer ceramic electronic component having excellent reliability.

According to an aspect of the present disclosure, a multilayer ceramic electronic component includes: a ceramic body having a capacitance formation portion including first and second surfaces opposing each other in a first direction, third and fourth surfaces opposing each other in a second direction, and fifth and sixth surfaces opposing each other in a third direction, and including a dielectric layer and first and second internal electrodes stacked in a third direction with the dielectric layer interposed therebetween, a first margin portion disposed on the third surface of the capacitance formation portion, and a second margin portion disposed on the fourth surface of the capacitance formation portion; a first external electrode connected to the first internal electrode; and a second external electrode connected to the second internal electrode, wherein a following formula 1 is satisfied, $$-0.1 \leq (Tm-Ta)/Ta \qquad \text{[formula 1]}$$

where, in the formula 1, Tm is an average height of a central region of the margin portion, and Ta is an average height of an outer region of the capacitance formation portion in the second direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
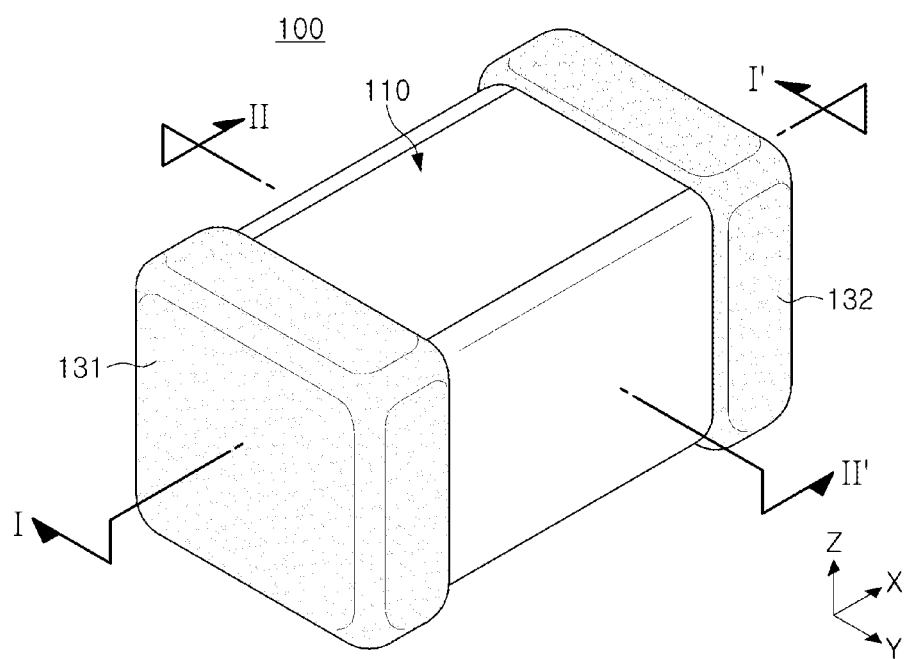
FIG. 1 is a schematic perspective view of a multilayer ceramic electronic component according to an embodiment of the present disclosure.
Figure 2:
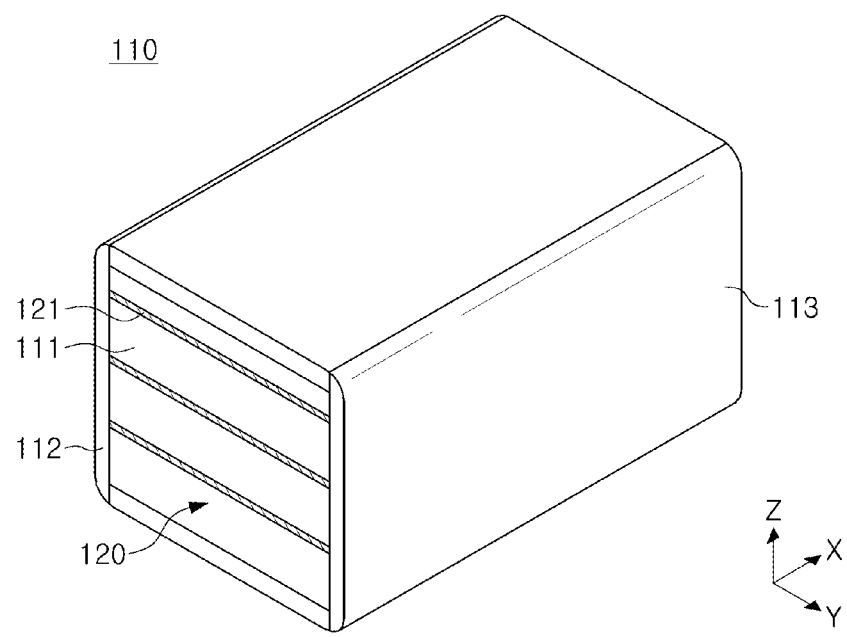
FIG. 2 is a perspective view schematically illustrating the ceramic body of FIG. 1.
Figure 3:
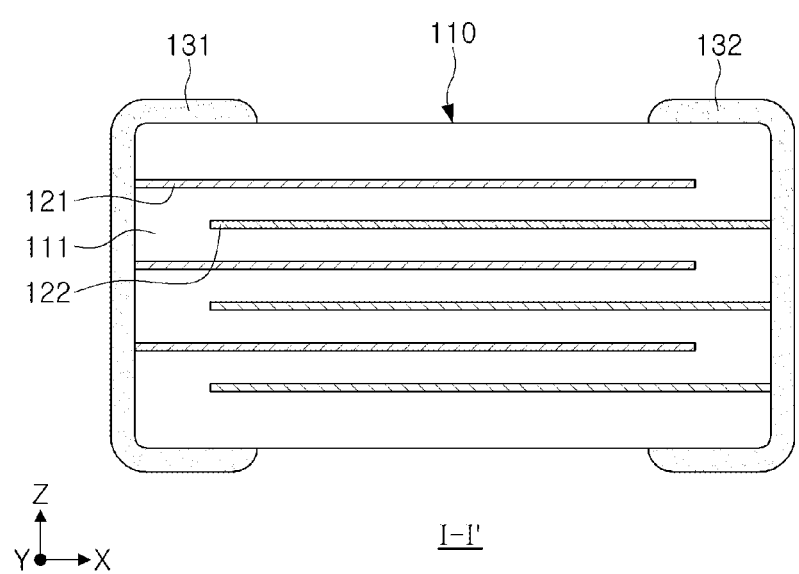
FIG. 3 is a cross-sectional view taken along line I-I' of FIG. 1.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction, or a length direction, a Y direction may be defined as a second direction, a W direction, or a width direction, and a Z direction may be defined as a third direction, a T direction, or a thickness direction.

The present disclosure relates to a multilayer ceramic electronic component 100. FIGS. 1 to 5 are views schematically illustrating a multilayer ceramic electronic component 100 according to an embodiment of the present disclosure. Referring to FIGS. 1 to 5, the multilayer ceramic electronic component 100 according to an embodiment of the present disclosure may include a ceramic body 110 including a capacitance formation portion 120 including first and second surfaces opposing each other in a first direction, third and fourth surfaces opposing each other in a second direction, and fifth and sixth surfaces opposing each other in a third direction, and including a dielectric layer 111 and a first internal electrode 121 and a second internal electrode 122 stacked in a third direction with the dielectric layer 111 interposed therebetween, a first margin portion 113 disposed on the third surface of the capacitance formation portion 120, and a second margin portion 112 disposed on the fourth surface of the capacitance formation portion 120; a first external electrode 131 connected to the first internal electrode 121; and a second eternal electrode 132 connected to the second internal electrode 122.

In this case, the multilayer ceramic electronic component 100 may satisfy General Formula 1 below, $$-0.1 \leq (Tm-Ta)/Ta \quad \text{[General Formula 1]}$$

where, in General Formula 1, Tm is an average height of a central region of the margin portion, and Ta is an average height of an outer region of the capacitance formation portion in a second direction.

Figure 4:
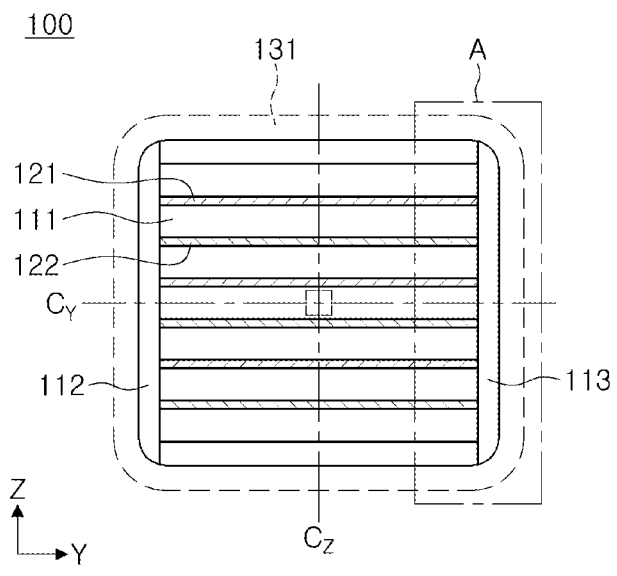
FIG. 4 is a cross-sectional view taken along line II-II' of FIG. 1.
Figure 5:
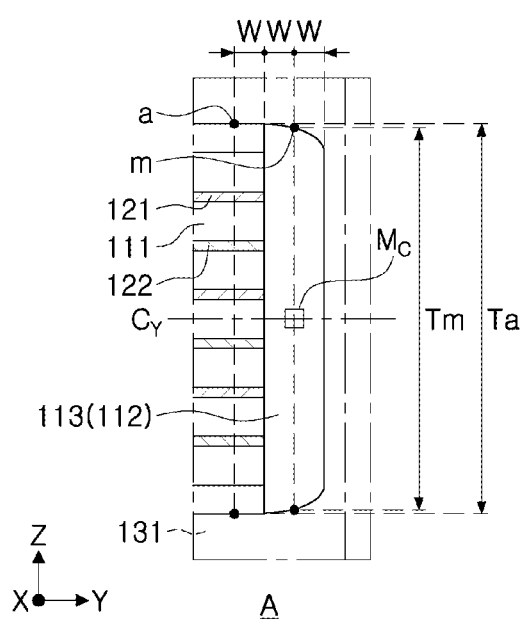
FIG. 5 is an enlarged view of area A of FIG. 4.

In the present specification, a term "central region" of the margin portion may mean a central region of the margin portion in the second direction, and may mean a region that has entered inwardly from an outer side surface of the margin portion by ½ of the average thickness of the margin portion. FIG. 4 is a cross-sectional view taken along line II-II' of FIG. 1, and FIG. 5 is an enlarged view of area A of FIG. 4. Referring to FIGS. 4 and 5, if an average thickness of the margin portions 113 and 112 is 2×W, a region in which a virtual line passing through a point (m) of a distance W from the outer side surfaces of the margin portions 113 and 112 and a virtual line ($C_y$) passing through the center of the ceramic body in a Y-axis direction meets may be referred to as a central region of the margin portion. In addition, in the present specification, a term "outer region" of the capacitance formation portion may mean a region skewed toward both sides of the capacitance formation portion in the second direction, and may mean a region on a virtual line passing through a point (a) that has entered inwardly by W from any one surface of the capacitance formation portion in the second direction. Referring to FIG. 5, a region of the capacitance formation portion located at a distance W from the virtual line connecting ends of the first internal electrode 121 and the second internal electrode 122 of the of the capacitance formation portion may be referred to as an outer region of the capacitance formation portion.

In the present specification, a height of the central region of the margin portions 113 and 112 may be a value measured in a third direction (Z direction) with respect to the central region of the margin portions 113 and 112, and may mean the shortest vertical distance from one side to the other side in the third direction (Z direction). In addition, the average height of the central region may be perpendicular to a Y-axis, and may be an arithmetic mean of values measured at 10 equally spaced locations in an X-axis direction with respect to a cut surface passing through the central region of the margin portions 113 and 112. More specifically, to reduce an error, 10 locations can be measured and averaged, excluding a region corresponding to both surfaces thereof in the first direction. In this case, after dividing the cut surface into 12 equal parts in the X-axis direction, and then an average height can be obtained by averaging the measurement values. In addition, the average height of the outer region of the capacitance formation portion 120 in the second direction may be a value measured in the same manner as the central region of the margin portions 113 and 112, may be perpendicular to the Y-axis, and may be an arithmetic mean of values measured at 10 equally spaced locations in the X-axis direction with respect to the cut surface passing through the outer region of the capacitance formation portion 120 in the second direction. In the multilayer ceramic electronic component 100 according to the present disclosure, the average height of the central region of the margin portions 113 and 112 and the average height of the outer region in the second direction of the capacitance formation portion 120 satisfy the general formula (1), such that it is possible to minimize structural deformation due to a difference in firing shrinkage between the capacitance formation portion 120 and the margin portions 113 and 112. The measurement may be performed by, for example, an optical microscope or a scanning electron microscope (SEM). The present disclosure, however, is not limited thereto. Other methods and/or tools appreciated by one of ordinary skill in the art, even if not described in the present disclosure, may also be used.

Figure 6:
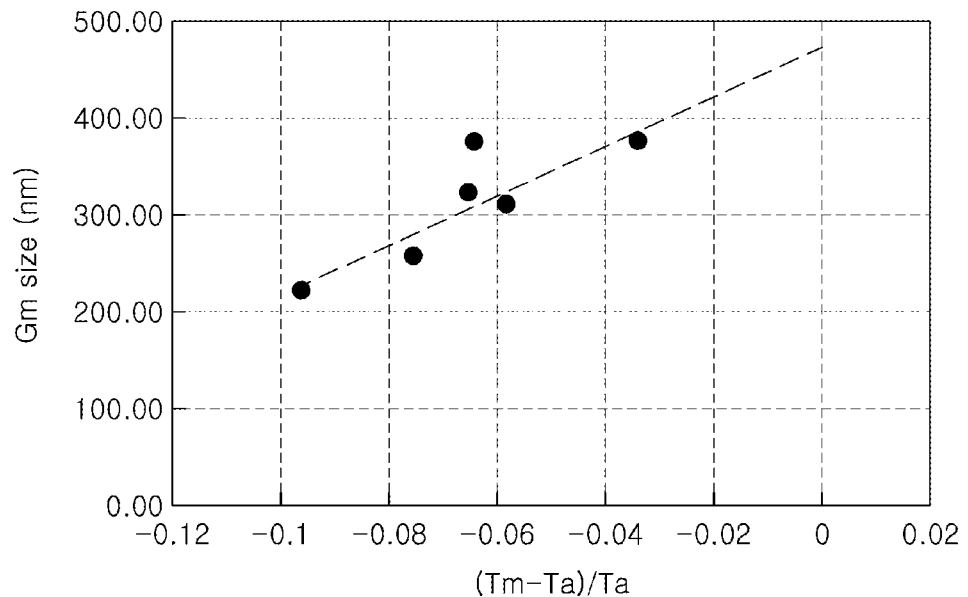
FIGS. 6 and 7 are graphs illustrating a relationship between a withstand voltage according to a change in (Tm−Ta)/Ta and an average particle diameter of grains of a dielectric layer in a central region of a capacitance formation portion of a multilayer ceramic electronic component according to another embodiment of the present disclosure.
Figure 7:
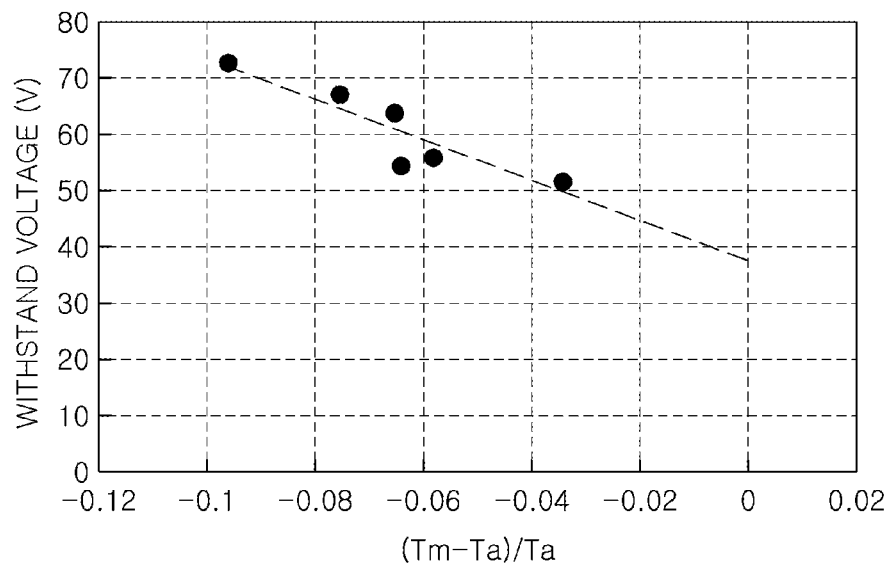

In one example, an upper limit of (Tm−Ta)/Ta in the General Formula 1 may be 0 or less. (Tm−Ta)/Ta of the General Formula 1 may be, for example, 0 or less, 0.01 or less, 0.015 or less, or 0.02 or less, but is not limited thereto. By making the ratio of (Tm−Ta)/Ta in the general formula 1 satisfy the above range, compressive stress may be locally formed on the outer region of the capacitance formation portion 120, and the size of dielectric grains in the outer region of the capacitance formation portion 120 may be reduced as shown in FIG. 6. Thereby, a fraction of a grain boundary having a relatively high resistance can be increased, and withstand voltage characteristics can be improved as shown in FIG. 7. For example, as shown in FIGS. 6 and 7, in a case in which (Tm−Ta)/Ta in the General Formula 1 is about −0.03 or less, the average particle diameter (Gm) of grains of the outer region of the capacitance formation portion in the second direction may be about 400 nm or less, and the withstand voltage may be 47 V or greater.

In an embodiment of the present disclosure, the ceramic body 110 of the multilayer ceramic electronic component 100 may include a capacitance formation portion 120, a first margin portion 113, and a second margin portion 112.

There is no particular limitation on the specific shape of the ceramic body 110, but as shown, the ceramic body 110 may have a hexahedral shape or a similar shape. Due to shrinkage of the ceramic powder included in the ceramic body 110 during a sintering process, the ceramic body 110 may have a substantially hexahedral shape although not a hexahedral shape having a complete straight line. If necessary, the ceramic body 110 may be rounding processed so that corners are not angled. The rounding process may use, for example, barrel polishing, but is not limited thereto.

In the capacitance formation portion 120 of the multilayer ceramic electronic component 100 according to the present disclosure, a dielectric layer 111, a first internal electrode 121, and a second internal electrode 122 may be alternately stacked. The dielectric layer 111, the first internal electrode 121, and the second internal electrode 122 may be stacked in a third direction (Z direction). The plurality of dielectric layers 111 are in a sintered state, a boundary between the adjacent dielectric layers 111 may be integrated to such an extent that it is difficult to determine without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like, or a component represented by $(Ba_{1-x}Ca_x)(Ti_{1-y}(Zr, Sn, Hf)_y)O_3$ (where, $0 \leq x \leq 1$, $0 \leq y \leq 0.5$) may be used. In addition, as a material for forming the dielectric layer 111, various ceramic additives, organic solvents, plasticizers, binders, dispersants, and the like may be added to powder such as barium titanate ($BaTiO_3$) according to the purpose of the present disclosure.

The dielectric layer 111 of the capacitance formation portion 120 may include dielectric grains. In addition, the dielectric layer 111 may include grain boundaries disposed between two or more grains. The grain can be distinguished by grain boundaries.

In one example of the present disclosure, a ratio (Gm/Gc) of an average particle diameter (Gm) of grains of an outer region of the capacitance formation portion in a second direction to an average particle diameter (Gc) of grains of the dielectric layer 111 of a central region of the capacitance formation portion 120 of the multilayer ceramic electronic component 100 according to the present disclosure may exceed 0.9. The central region of the capacitor 120 may mean a region near a center of the multilayer ceramic electronic component 100, and may mean a region in which a center in an X-axis direction, a center in a Y-axis direction, and a center in a Z-axis direction cross each other.

In addition, a ratio(Gm/Gc) of an average particle diameter (Gm) of grains of an outer region of the capacitance formation portion in a second direction with respect to an average particle diameter (Gc) of grains of the dielectric layer 111 of a central region of the capacitance formation portion may be less than 1.3. When the ratio (Gm/Gc) of the average particle diameter (Gm) of grains of an outer region of the capacitance formation portion 120 in a second direction to the average particle diameter (Gc) of grains of the dielectric layer 111 of a central region of the capacitance formation portion 120 is out of the above range, a stress between the central region of the capacitance formation portion 120 and the outer region of the capacitance formation portion 120 in the second direction may increase, resulting in a shape change, and a short circuit may occur.

In the present specification, a term "average particle diameter" of the grain may be an arithmetic mean of particle diameters measured in 10 locations in an X-Z cross-section of the capacitance formation portion 120. The 10 locations may be an arithmetic average of values measured at 10 locations having equal intervals in the X-axis direction with respect to a cut surface perpendicular to the Y-axis of the multilayer ceramic electronic component 100 and passing through the center thereof. The particle diameter of the grain may mean a length in the length direction calculated through an image analysis program (Mediacybernetics' Image Pro Plus ver 4.5) after an image of cut-sections of the electronic component is captured using an optical device such as a scanning electron microscope (SEM, Jeol's JSM-7400F).

In one example, an average thickness of the dielectric layer 111 may be 0.5 µm or less. The average thickness of the dielectric layer 111 may be an average of values measured at five different locations of the sintered dielectric layer 111. A lower limit of the average thickness of the dielectric layer 111 is not particularly limited, but may be, for example, 0.01 µm or more. The thickness may be measured by, for example, an optical microscope or a scanning electron microscope (SEM).

The dielectric layer 111 may be formed by adding an additive to a slurry containing the above-described material, and applying and drying the same on a carrier film to prepare a plurality of ceramic sheets. The ceramic sheet may be formed by manufacturing the slurry in a sheet shape having a thickness of several µms by a doctor blade method, but is not limited thereto.

In an example of the present disclosure, a first internal electrode 121 of the multilayer ceramic electronic component 100 may be drawn out to the first surface, the third surface, and the fourth surface of the capacitance formation portion 120. The first internal electrode 121 drawn out to the first surface of the capacitance formation portion 120 may be connected to a first external electrode 131 to be described later, and the first internal electrode 121 may not be drawn out to the second surface of the capacitance formation portion 120. In addition, a second internal electrode 122 of the multilayer ceramic electronic component 100 may be drawn out to the second surface, the third surface, and the fourth surface of the capacitance formation portion 120. The second internal electrode 122 drawn out to the second surface of the capacitance formation portion 120 may be connected to a second external electrode 132 to be described later, and the first internal electrode 121 may not be drawn out to the first surface of the capacitance formation portion 120.

In one example, an average thickness of the first and second internal electrodes 121 and 122 may be 0.5 µm or less. The average thickness of the first and second internal electrodes 121 and 122 may be an average of values measured at five different locations of the sintered internal electrodes. A lower limit of the average thickness of the first and second internal electrodes 121 and 122 is not particularly limited, but may be, for example, 0.01 µm or more.

A material of the first and second internal electrodes 121 and 122 may not be limited to any particular material, and may be formed using a conductive paste including one or more conductive metals from among silver (Ag), palladium (Pd), gold (Au), platinum (Pt), nickel (Ni), copper (Cu), tin (Sn), tungsten (W), titanium (Ti), and alloys thereof.

The ceramic body 110 may be formed by alternately laminating a ceramic green sheet on which the first internal electrode 121 is printed and a ceramic green sheet on which the second internal electrode 122 is printed on the dielectric layer third direction (Z direction). As a method of printing the first and second internal electrodes 121 and 122, a screen-printing method, a gravure printing method, or the like, may be used, but the printing method is not limited thereto.

In an embodiment of the present disclosure, a first margin portion 113 may be disposed on the third surface of the capacitance formation portion 120 of the multilayer ceramic electronic component 100 of the present disclosure, and a second margin portion 112 is disposed on the fourth surface thereof. The first margin portion 113 and the second margin portion 112 may include a ceramic material, may include barium (Ba) and titanium (Ti), for example, a barium titanate ($BaTiO_3$)-based ceramic material.

In an example of the present disclosure, the first margin portion 113 and the second margin portion 112 of the multilayer ceramic electronic component 100 according to the present disclosure may include a ceramic component having a composition similar to that of the dielectric layer 111 of the capacitance formation portion 120 as a main component. In the present specification, a term "main component" may mean a component occupying a relatively large weight ratio compared to other components, and may mean a component that is 50% by weight or more based on the weight of the entire composition or the entire dielectric layer. In addition, a term "subcomponent" may mean a component occupying a relatively small weight ratio compared to other components, and may mean a component that is less than 50% by weight based on the weight of the entire composition or the entire dielectric layer.

The main component may be a component represented by $(Ba_{1-x}Ca_x)(Ti_{1-y}(Zr, Sn, Hf)_y)O_3$ (where, $0 \leq x \leq 1$, $0 \leq y \leq 0.5$). The main component may be, for example, a chemical in which Ca, Zr, Sn and/or Hf are partially dissolved in $BaTiO_3$. In the above compositional formula, x may be in a range of 0 or more and 1 or less, and y may be in a range of 0 or more and 0.5 or less, but is not limited thereto. For example, when x is 0, y is 0, and z is 0 in the above compositional formula, the main component may be $BaTiO_3$.

In an embodiment of the present disclosure, a ratio of barium (Ba) to titanium (Ti) of the dielectric layer 111 of the capacitance formation portion 120 of the multilayer ceramic electronic component 100 and a ratio of barium (Ba) to titanium (Ti) of the margin portions 112 and 113 according to the present disclosure may be different. When the ratio (Ba/Ti) of barium (Ba) to titanium (Ti) has different values between the dielectric layer 111 of the capacitance formation portion 120 and the margin portions 113 and 112, it is possible to offset a difference in firing shrinkage of the dielectric layer 111 including an internal electrode and firing shrinkage of the margin portions 113 and 112 not including the electrode, thereby suppressing structural deformation of the multilayer ceramic electronic component 100.

In one example, the ratio (Ba/Ti) of barium (Ba) to titanium (Ti) of the margin portions 113 and 112 may exceed 1. The ratio (Ba/Ti) of barium (Ba) to titanium (Ti) of the margin portions 113 and 112 may affect a shrinkage initiation temperature during sintering. When the ratio (Ba/Ti) of barium (Ba) to titanium (Ti) of the margin portions 113 and 112 is 1 or less, firing shrinkage may start from a low temperature, and accordingly, sintering may be completed at a low temperature. In this case, the stress due to the difference in firing shrinkage of the capacitance formation portion 120 with the dielectric layer 111 may increase, and a short circuit rate may increase. An upper limit of the ratio (Ba/Ti) of barium (Ba) to titanium (Ti) of the margin portions 113 and 112 is not particularly limited, but may be, for example, 1.5 or less, but is not limited thereto.

The first margin portion 113 and the second margin portion 112 may be formed by stacking a single dielectric layer or two or more dielectric layers, respectively, and basically serve to prevent damage to the internal electrodes due to physical or chemical stresses.

A method of forming the margin portions 113 and 112 of the multilayer ceramic electronic component 100 according to the present disclosure is not particularly limited, but, for example, may be formed by attaching a ceramic sheet for forming the first margin portion 113 and a ceramic sheet for forming the second margin portion 112. The first and second margin portions 113 and 112 may be formed by fixing the capacitance formation portion 120 to a jig or the like, and then transferring the ceramic sheet, but is not limited thereto.

In the multilayer ceramic electronic component 100 according to an example of the present disclosure, a first external electrode 131 and a second external electrode 132 may be disposed on an outer surface of the ceramic body 110. The first external electrode 131 may be connected to a first internal electrode 121, and the second external electrode 132 may be connected to a second internal electrode 122. In this case, the first external electrode 131 may be disposed on the first surface of the capacitance formation portion 120 of the multilayer ceramic electronic component 100 according to the present disclosure, and the second external electrode 132 may be disposed on the second surface of the capacitance formation portion 120.

In one example, at least a portion of the first external electrode 131 may be disposed to extend onto the third surface, the fourth surface, the fifth surface, and the sixth surface of the capacitance formation portion 120. In addition, at least a portion of the second external electrode 131 and/or the second external electrode 132 may be disposed to extend onto the third surface, the fourth surface, the fifth surface, and the sixth surface of the capacitance formation portion 120. In this case, the first external electrode 131 and the second external electrode 132 may be disposed to be spaced apart from each other. When at least a portion of the first external electrode 131 and/or the second external electrode 132 is disposed to extend onto the third surface, the fourth surface, the fifth surface, and the sixth surface of the capacitance formation portion 120, respectively. When the extended portion is disposed, the extended portion may function as a so-called band portion, and may improve mounting strength of the multilayer ceramic electronic component 100 and prevent moisture penetration.

The first external electrode 131 and the second external electrode 132 may be sintered electrodes including conductive metal and glass. The glass may be a composition in which oxides are mixed, and may not be particularly limited, but may be one or more selected from a group consisting of a silicon oxide, a boron oxide, an aluminum oxide, a transition metal oxide, an alkali metal oxide, and an alkaline earth metal oxide. The transition metal may be selected from a group consisting of zinc (Zn), titanium (Ti), copper (Cu), vanadium (V), manganese (Mn), iron (Fe), and nickel (Ni), the alkali metal may be selected from a group consisting of lithium (Li), sodium (Na) and potassium (K), and the alkaline earth metal may be one or more selected from a group consisting of magnesium (Mg), calcium (Ca), strontium (Sr), and barium (Ba).

As an example of a method of forming the first electrode layer 131 and the second electrode layer 132, the first electrode layer 131 and the second electrode layer 132 may be formed by dipping a ceramic body 110 into a conductive paste containing conductive metal and then sintering the same, or formed by printing the conductive paste on the surface of the ceramic body 110 by a screen printing method or a gravure printing method and sintering the same. In addition, the first electrode layer 131 and the second electrode layer 132 may be formed by applying the conductive paste to the surface of the ceramic body or transferring a dried film obtained by drying the conductive paste onto the ceramic body and then sintering the same, but is not limited thereto. For example, it may be formed of a conductive paste on a ceramic body 110 and then sintering the same by various methods other than the above-described methods.

In one example, the multilayer ceramic electronic component according to the present disclosure may further include a plating layer respectively disposed on the first external electrode 131 and the second external electrode 132. The plating layer may include one or more of copper (Cu), nickel (Ni), tin (Sn), palladium (Pd), platinum (Pt), iron (Fe), gold (Au), silver (Ag), tungsten (W), titanium (Ti), lead (Pb), and alloys thereof. The plating layer may be formed as a single layer or a plurality of layers, and may be formed by sputtering or electroplating, but is not limited thereto.

As set forth above, according to one of the various effects of the present disclosure, structural deformation of a multilayer ceramic electronic component may be suppressed.

According to one of the various effects of the present disclosure, a short circuit rate of a multilayer ceramic electronic component may be reduced.

According to one of the various effects of the present disclosure, a multilayer ceramic electronic component having improved withstand voltage characteristics may be provided.

According to one of the various effects of the present disclosure, reliability of a multilayer ceramic electronic component may be improved.

However, various and advantageous advantages and effects of the present invention are not limited to the above description, and will be more readily understood in the process of describing specific embodiments of the present invention.

While the embodiments have been illustrated and described above, it will be apparent to those skilled in the art that modifications and variations could be made without departing from the scope in the embodiment as defined by the appended claims.

What is claimed is:

1. A multilayer ceramic electronic component, comprising:
   a ceramic body having a capacitance formation portion including first and second surfaces opposing each other in a first direction, third and fourth surfaces opposing each other in a second direction, and fifth and sixth surfaces opposing each other in a third direction, and including a dielectric layer and a first internal electrode and a second internal electrode stacked in the third direction with the dielectric layer interposed therebetween, a first margin portion disposed on the third surface of the capacitance formation portion, and a second margin portion disposed on the fourth surface of the capacitance formation portion;
   a first external electrode connected to the first internal electrode; and
   a second external electrode connected to the second internal electrode,
   wherein a following formula 1 is satisfied, $-0.1 \leq (Tm-Ta)/Ta,$  [formula 1]

where in the formula 1, Tm is an average height, in the third direction, of a central region of at least one of the first or second margin portions in the second direction, and Ta is an average height, in the third direction, of an outer region of the capacitance formation portion in the second direction, and
   wherein $Tm \neq Ta$.

2. The multilayer ceramic electronic component of claim 1, wherein $(Tm-Ta)/Ta$ is less than 0.

3. The multilayer ceramic electronic component of claim 1, wherein the dielectric layer of the capacitance formation portion comprises dielectric grains, and
   a ratio (Gm/Gc) of an average particle diameter (Gm) of dielectric grains of the outer region of the capacitance formation portion in the second direction to an average particle diameter (Gc) of dielectric grains of the dielectric layer in a central region of the capacitance formation portion exceeds 0.9.

4. The multilayer ceramic electronic component of claim 3, wherein the ratio (Gm/Gc) is less than 1.3.

5. The multilayer ceramic electronic component of claim 1, wherein the dielectric layer, and the first and second margin portions comprise barium (Ba) and titanium (Ti), and
   a ratio of barium (Ba) to titanium (Ti) of the dielectric layer of the capacitance formation portion and a ratio of barium (Ba) to titanium (Ti) of one of the first and second margin portions are different.

6. The multilayer ceramic electronic component of claim 5, wherein the ratio (Ba/Ti) of barium (Ba) to titanium (Ti) of the one of the first and second margin portions exceeds 1.

7. The multilayer ceramic electronic component of claim 1, wherein an average thickness of the dielectric layer of the capacitance formation portion is 0.5 µm or less.

8. The multilayer ceramic electronic component of claim 1, wherein the first internal electrode is in contact with the first surface, the third surface, and the fourth surface of the capacitance formation portion,
   wherein the second internal electrode is in contact with the second surface, the third surface, and the fourth surface of the capacitance formation portion.

9. The multilayer ceramic electronic component of claim 1, wherein the first internal electrode and the second internal electrode have an average thickness of 0.5 µm or less.

10. The multilayer ceramic electronic component of claim 1, wherein one of the first internal electrode and the second internal electrode has an average thickness of 0.5 µm or less.

11. The multilayer ceramic electronic component of claim 1, wherein the first external electrode is disposed on the first surface of the capacitance formation portion,
    wherein the second external electrode is disposed on the second surface of the capacitance formation portion.

12. The multilayer ceramic electronic component of claim 11, wherein at least a portion of the first external electrode is disposed to extend over the third surface, the fourth surface, the fifth surface, and the sixth surface of the capacitance formation portion,
    wherein at least a portion of the second external electrode is disposed to extend over the third surface, the fourth surface, the fifth surface, and the sixth surface of the capacitance formation portion.

* * * * *